United States Patent
Xu (10) Patent No.: US 10,928,489 B2
(45) Date of Patent: Feb. 23, 2021

(54) TIME OF FLIGHT CAMERA

(71) Applicant: Microsoft Technology Licensing, LLC, Redmond, WA (US)

(72) Inventor: Zhanping Xu, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 290 days.

(21) Appl. No.: 15/480,823

(22) Filed: Apr. 6, 2017

(65) Prior Publication Data
US 2018/0292516 A1    Oct. 11, 2018

(51) Int. Cl.
| | |
|---|---|
| *G01S 7/00* | (2006.01) |
| *G01S 7/4861* | (2020.01) |
| *G01S 7/493* | (2006.01) |
| *G01S 17/46* | (2006.01) |
| *G01S 17/36* | (2006.01) |
| *G01S 7/4915* | (2020.01) |
| *G01S 17/89* | (2020.01) |
| *G01S 7/4912* | (2020.01) |
| *G01S 7/4865* | (2020.01) |
| *G01S 7/486* | (2020.01) |
| *G01S 17/10* | (2020.01) |

(52) U.S. Cl.
CPC .......... *G01S 7/4861* (2013.01); *G01S 7/4865* (2013.01); *G01S 7/4868* (2013.01); *G01S 7/493* (2013.01); *G01S 7/4915* (2013.01); *G01S 7/4918* (2013.01); *G01S 17/10* (2013.01); *G01S 17/36* (2013.01); *G01S 17/46* (2013.01); *G01S 17/89* (2013.01)

(58) Field of Classification Search
USPC ................................................ 356/3.01–5.15
See application file for complete search history.

(56) References Cited

U.S. PATENT DOCUMENTS

| | | |
|---|---|---|
| 3,704,465 A | 11/1972 | Masak et al. |
| 4,864,395 A | 9/1989 | Tajima |

(Continued)

FOREIGN PATENT DOCUMENTS

| | | |
|---|---|---|
| EP | 2116864 A1 | 11/2009 |
| EP | 2157401 A1 | 2/2010 |

(Continued)

OTHER PUBLICATIONS

Lefloch, et al., "Technical Foundation and Calibration Methods for Time-of-Flight Cameras", In Time-of-Flight and Depth Imaging. Sensors, Algorithms, and Applications, vol. 8200, Sep. 23, 2013, pp. 3-24.

(Continued)

*Primary Examiner* — James R Hulka (57) ABSTRACT

A continuous wave time of flight (CW-TOF) camera that modulates sensitivity of its photosensor during an exposure period at a frequency of modulation of structured light that the camera transmits to illuminate a scene that it images but phase shifted relative to phase of the transmitted light by a sampling phase offset modified by a sequence of N perturbation phase shifts $\lambda_n = 2\pi(n-1)/N$, $(1 \leq n \leq N)$, and modifies the structured light in synchrony with the sequence of perturbation phase shifts to reduce error due to multipath interference in determining distances to features in the scene.

21 Claims, 3 Drawing Sheets

(56) References Cited

U.S. PATENT DOCUMENTS

| | | | |
|---|---|---|---|
| 5,579,107 A | 11/1996 | Wright et al. | |
| 5,581,345 A | 12/1996 | Oki et al. | |
| 6,323,942 B1 | 11/2001 | Bamji | |
| 6,515,740 B2 | 2/2003 | Bamji et al. | |
| 6,580,496 B2 | 6/2003 | Bamji et al. | |
| 6,697,010 B1 | 2/2004 | Lam | |
| 6,707,054 B2* | 3/2004 | Ray | G01S 7/4915 250/559.38 |
| 6,906,793 B2 | 6/2005 | Bamji et al. | |
| 7,589,316 B2 | 9/2009 | Dunki-Jacobs | |
| 7,719,662 B2 | 5/2010 | Bamji et al. | |
| 8,363,927 B2 | 1/2013 | Rutschmann et al. | |
| 8,587,771 B2 | 11/2013 | Xu et al. | |
| 8,723,924 B2 | 5/2014 | Mirbach et al. | |
| 9,325,920 B2* | 4/2016 | Van Nieuwenhove | G01S 17/89 |
| 9,329,035 B2 | 5/2016 | Oggier | |
| 9,405,008 B2 | 8/2016 | Raskar et al. | |
| 9,435,891 B2 | 9/2016 | Oggier | |
| 9,442,186 B2 | 9/2016 | Payne et al. | |
| 9,482,514 B2 | 11/2016 | Bridges | |
| 9,542,749 B2 | 1/2017 | Freedman et al. | |
| 9,580,496 B2 | 2/2017 | Gearing | |
| 9,753,128 B2* | 9/2017 | Schweizer | G01S 17/89 |
| 9,874,638 B2* | 1/2018 | Dorrington | G01S 7/493 |
| 9,989,630 B2* | 6/2018 | Gruenwald | H04B 5/02 |
| 10,061,029 B2 | 8/2018 | Waligorski et al. | |
| 10,215,856 B1 | 2/2019 | Xu | |
| 10,401,498 B2* | 9/2019 | Oggier | G01S 7/4915 |
| 10,430,958 B2* | 10/2019 | Akkaya | G01S 17/89 |
| 10,605,916 B2 | 3/2020 | Molnar et al. | |
| 2002/0084430 A1* | 7/2002 | Bamji | G01S 17/89 250/559.05 |
| 2003/0076484 A1* | 4/2003 | Bamji | G01S 17/89 356/5.1 |
| 2003/0178549 A1* | 9/2003 | Ray | G01S 17/36 250/208.1 |
| 2004/0213463 A1* | 10/2004 | Morrison | G01B 11/25 382/210 |
| 2007/0127009 A1 | 6/2007 | Chen et al. | |
| 2008/0068583 A1 | 3/2008 | Hiraide | |
| 2008/0173803 A1* | 7/2008 | Dunki-Jacobs | A61B 1/045 250/234 |
| 2008/0180650 A1 | 7/2008 | Lamesch | |
| 2009/0115995 A1* | 5/2009 | Bamji | G01S 7/497 356/5.01 |
| 2009/0237640 A1 | 9/2009 | Krikorian et al. | |
| 2010/0296726 A1* | 11/2010 | Rutschmann | A61B 5/1074 382/154 |
| 2011/0018967 A1* | 1/2011 | Mirbach | G01S 17/89 348/46 |
| 2012/0013887 A1 | 1/2012 | Xu et al. | |
| 2012/0033045 A1 | 2/2012 | Schweizer et al. | |
| 2013/0088726 A1* | 4/2013 | Goyal | G01S 7/4866 356/634 |
| 2013/0148102 A1* | 6/2013 | Oggier | G01S 17/894 356/5.01 |
| 2014/0049767 A1 | 2/2014 | Benedetti et al. | |
| 2014/0055771 A1* | 2/2014 | Oggier | G01S 17/89 356/5.01 |
| 2014/0170137 A1* | 6/2014 | Gearing | C07K 16/467 424/133.1 |
| 2014/0267620 A1* | 9/2014 | Bridges | G01B 21/045 348/46 |
| 2014/0313376 A1* | 10/2014 | Van Nieuwenhove | G01S 17/89 348/241 |
| 2014/0333917 A1* | 11/2014 | Payne | G01S 17/36 356/5.01 |
| 2014/0340569 A1 | 11/2014 | Raskar et al. | |
| 2015/0056183 A9* | 2/2015 | Gearing | A61P 25/04 424/133.1 |
| 2015/0193938 A1 | 7/2015 | Freedman et al. | |
| 2015/0253429 A1* | 9/2015 | Dorrington | G01S 17/89 356/5.01 |
| 2016/0005179 A1* | 1/2016 | Petyushko | G06T 5/50 382/154 |
| 2016/0109575 A1* | 4/2016 | Oggier | G01S 17/89 356/5.01 |
| 2016/0198147 A1* | 7/2016 | Waligorski | G01S 7/4816 348/49 |
| 2016/0334509 A1 | 11/2016 | Gruenwald | |
| 2017/0123067 A1* | 5/2017 | Van Der Tempel | G01S 17/89 |
| 2017/0322309 A1* | 11/2017 | Godbaz | H04N 13/254 |
| 2018/0146186 A1 | 5/2018 | Akkaya et al. | |
| 2019/0019302 A1 | 1/2019 | Akkaya et al. | |
| 2019/0033448 A1* | 1/2019 | Molnar | G01S 7/4814 |
| 2019/0219696 A1 | 7/2019 | Xu | |

FOREIGN PATENT DOCUMENTS

| | | |
|---|---|---|
| JP | H09269372 A | 10/1997 |
| JP | 2000517427 A | 12/2000 |
| JP | 2006214998 A | 8/2006 |
| JP | 2008164496 A | 7/2008 |
| JP | 2009063303 A | 3/2009 |
| WO | 2015133910 A2 | 9/2015 |
| WO | 2016149438 A1 | 9/2016 |
| WO | 2016171913 A1 | 10/2016 |
| WO | 2017138032 | 8/2017 |
| WO | 2018187106 A1 | 10/2018 |

OTHER PUBLICATIONS

Bhandari, et al., "Resolving Multipath Interference in Kinect: An Inverse Problem Approach", In IEEE Sensors Journal, vol. 16, Issue 10, May 15, 2016, 4 pages.

"Office Action Issued in Korean Patent Application No. 10-2013-7001077", dated May 16, 2017, 4 Pages.

"Office Action Issued in European Patent Application No. 11807282.6", dated Jul. 24, 2014, 4 Pages.

"Office Action Issued in European Patent Application No. 11807282.6", dated Jan. 27, 2015, 4 Pages.

"Search Report Issued in European Patent Application No. 11807282.6", dated Apr. 17, 2013, 8 Pages.

"International Search Report and Written Opinion Issued in PCT Application No. PCT/US2011/42643", dated Dec. 22, 2011, 8 Pages.

"First Office Action and Search Report Issued in Chinese Patent Application No. 201110206379.8", dated Nov. 2, 2012, 9 Pages.

"Second Office Action Issued in Chinese Patent Application No. 201110206379.8", dated May 14, 2013, 8 Pages.

"Office Action Issued in Japanese Patent Application No. 2013-520728", dated Feb. 19, 2015, 7 Pages.

"International Search Report and Written Opinion Issued in PCT Application No. PCT/US2018/024700", dated Jul. 9, 2018, 14 Pages.

Klein, Jonathan, "Correction of Multipath-Effects in Time-of-Flight Range Data", In Master's thesis of University of Siegen, Jan. 6, 2014, 95 Pages.

Dorrington, et al., "Separating true range measurements from multi-path and scattering interference in commercial range cameras", In Proceedings of the International Society for Optical Engineering, vol. 7864, Jan. 27, 2011, 10 Pages.

Bhandari, et al., "Resolving Multi-path Interference in Time-of-Flight Imaging via Modulation Frequency Diversity and Sparse Regularization", In Journal of Optics Letters, vol. 39, Issue 06, Apr. 2014, pp. 1-11.

"International Search Report and Written Opinion Issued in PCT Application No. PCT/US18/59553", dated Feb. 12, 2019, 13 Pages.

"International Search Report and Written Opinion Issued in PCT Application No. PCT/US18/067773", dated Mar. 28, 2019, 16 Pages.

"Non Final Office Action Issued in U.S. Appl. No. 16/245,248", dated Jun. 27, 2019, 10 Pages.

(56) References Cited

OTHER PUBLICATIONS

"Non Final Office Action Issued in U.S. Appl. No. 15/871,291", dated May 21, 2020, 11 Pages.

* cited by examiner

TIME OF FLIGHT CAMERA

BACKGROUND

A "continuous wave" time of flight (TOF) camera (CW-TOF), transmits a "continuous wave" of electromagnetic radiation, optionally infrared (IR) light, having intensity that is periodically modulated to illuminate a scene that the camera images. Light reflected from the transmitted light by a given feature in the scene reaches the camera as a wave of reflected light having a same modulation as the transmitted light but retarded in phase by a propagation phase delay, "$\varphi_d$", which is a function of a round trip time $t_R$ for light to propagate from the camera to the given feature and back to camera, and thereby a distance, "d", to the feature. The camera images the light reflected by the given feature on a pixel of a photosensor for each of a plurality of exposure periods to accumulate electric charge, "photocharge" that the imaged light generates in the pixel during the exposure period. For each of the exposure periods, sensitivity of the photosensor to light is modulated at a different sampling phase offset relative to phase of modulation of light that the camera transmits. The amount of photocharge accumulated for a given sampling phase offset is proportional to a convolution of the exposure period associated with the sampling phase offset and the reflected light, and is a function of propagation phase delay $\varphi_d$. The CW-TOF camera processes the accumulated photocharges for the different sampling phase offsets to determine $\varphi_d$ and therefrom and distance "d" to the feature.

SUMMARY

An aspect of an embodiment of the disclosure relates to providing a CW-TOF camera having reduced sensitivity to error generated by multipath interference (MPI) in a phase delay $\varphi_d$ and distance d that the camera determines to a given feature in a scene that the camera images.

In an embodiment, for each sampling phase offset that the CW-TOF camera uses to determine propagation phase delays $\varphi_d$ and therefrom distances to features in a scene that the camera images, the camera accumulates photocharge during an exposure period for which the sampling phase offset is modified by a sequence of "perturbation phase shifts". The camera synchronizes the sequence of perturbation phase shifts with modulation of structured light that the camera transmits to illuminate the scene so that contribution of MP light to photocharge accumulated for features in the scene and the sampling phase offset is substantially independent of the sampling phase offset. As a result, the CW-TOF camera is characterized by enhanced resistance to error generated by MPI in propagation phase delays $\varphi_d$ and distances d for features in the scene.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Reflected light from a given feature in a scene that a CW-TOF camera images on a photosensor pixel is not limited to "direct light" that propagates directly from the camera light source to the given feature and back to the camera. Reflected light from the given feature may have "bounced" to the given feature from another feature in the scene before being reflected by the given feature to the CW-TOF camera. The bounced light from the other feature travels a longer path, a "multipath", to the camera than direct light and therefore has a different, and larger propagation phase delay than direct light. Photocharge generated by multipath (MP) light incident on the pixel therefore contaminates photocharge generated by direct light incident on the pixel and generates error due to MPI in the phase delay $\varphi_d$ and distance d to the given feature that the camera determines.

In the discussion below operation of a CW-TOF camera is discussed with reference to FIG. 1A which illustrates the CW-TOF camera imaging a scene to acquire a range image of the scene that provides distances to features of the scene in the absence of MPI. MPI and its effects on determination of propagation phase delays $\varphi_d$ and distances to features in a scene are discussed with reference to FIG. 1B, which schematically shows the CW-TOF camera shown in FIG. 1A imaging the same scene but in the presence of MPI. Structure and operation of a CW-TOF camera configured in accordance with an embodiment of the disclosure to reduce MPI error in propagation phase delay $\varphi_d$ and distance based on $\varphi_d$ are discussed with reference to FIG. 2.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one, or any combination of more than one of the items it conjoins.

Figure 1A:
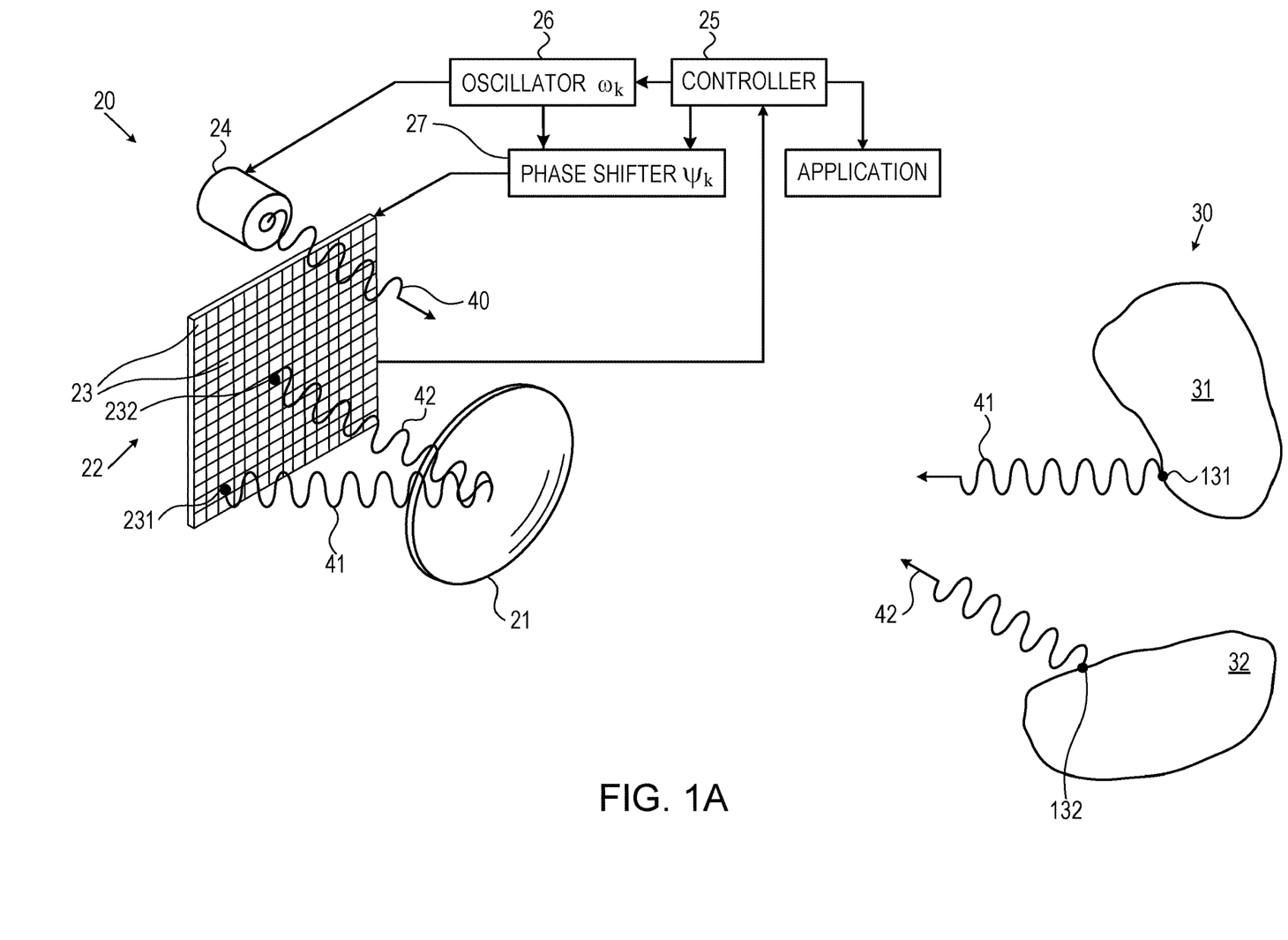
FIG. 1A schematically shows a CW-TOF camera determining distances to features in a scene in the absence of multipath interference (MPI)

FIG. 1A schematically shows a CW-TOF camera 20 operating to determine distances to features in a scene 30 optionally having objects 31 and 32. CW-TOF camera 20, which is represented very schematically, comprises an optical system represented by a lens 21, and a photosensor 22 having an array of rows and columns of pixels 23 on which optical system 21 images features of scene 30. A given pixel 23 in photosensor 22 may be designated p(i,j), where "i" and "j" are indices that indicate a row and a column respectively of photosensor 22 in which the pixel is located. A feature in scene 30 that CW-TOF camera 20 images on a pixel p(i,j) may be referred to as a feature f(i,j), and/or by a reference label. CW-TOF camera 20 may comprise a light source 24, an oscillator 26, a phase shifter 27, and a controller 25 that controls components comprised in the CW-TOF camera.

To acquire a range image of scene 30, controller 25 controls CW-TOF camera 20 to acquire a plurality of K images of scene 30 each at a different sampling phase offset $\psi_k$ of a plurality of K sampling phase offsets ($1 \leq k \leq K$), where $\psi_k$ is equal to $2\pi(k-1)/K$, where k and K are integers. For a k-th image of the K images, controller 25 controls oscillator 26 to provide a frequency signal having angular frequency $\omega_k$ and controls light source 24 to transmit light continuously modulated at the angular frequency provided by the oscillator. Light transmitted by light source 24 is schematically represented by a wavy line 40 having an arrow indicating direction of propagation of the transmitted light. While illuminating scene 30 with light 40, controller 25 turns on photosensor 22 for an exposure period "$Ex_k$" to register light that features in scene 30 reflect from transmitted light 40 back to camera 20 and optical system 21 images on pixels 23 of photosensor 22. During the exposure period controller 25 modulates sensitivity of photosensor 22 at angular frequency $\omega_k$ provided by oscillator 26, but controls phase shifter 27 to shift the phase of modulation of the photosensor by sampling phase offset $\psi_k$ relative to phase of modulation of transmitted light 40. Optionally, angular frequency $\omega_k$ is the same for all values of k and is hereinafter assumed for convenience of presentation equal to an angular frequency $\omega$.

A pixel 23 in photosensor 22 registers light reflected from a feature in scene 30 that optical system 21 images on the pixel during exposure period $Ex_k$ by accumulating photocharge that the light generates in the pixel during the exposure period. By way of example, FIG. 1A schematically shows features 131 and 132 of objects 31 and 32 respectively, reflecting light from light 40 back to CW-TOF camera 20. Reflected light from feature 131 is schematically represented by a wavy line 41 having an arrow indicating direction of propagation of the light, which optical system 21 images on a pixel 23, p(i,j), which is designated pixel 231 in photosensor 22. An amount of photocharge that pixel 231 accumulates is proportional to a convolution of reflected light 41 with sensitivity exposure period $Ex_k$. The convolution is a function of sampling phase offset $\psi_k$ and a propagation delay $\varphi_d(131)$ resulting from a round trip time $t_R$ for light to travel from light source 24 to feature 131 and back to CW-TOF camera 20. In symbols, $\varphi_d(131)=\omega t_R(131)$, where $t_R(131)$ is a round trip time for light to travel from light source 24 to feature 131 and back to the camera. Since $t_R(131)$ is equal to $2d(131)/c$, where $d(131)$ is the distance from CW-TOF camera 20 to feature 131 and c the speed of light, propagation phase delay $\varphi_d(131)$ is also equal to $2\omega d(131)/c$. Similarly, reflected light from feature 132 is schematically represented by a wavy line 42 and direction arrow, which is imaged by optical system 21 on a pixel 232, and an amount of photocharge that pixel 232 accumulates for feature 132 during exposure period $Ex_k$ is proportional to a convolution of reflected light 42 with the exposure period. The convolution is a function of sampling phase offset $\psi_k$ and a propagation phase delay $\varphi_d(132)=2\omega d(132)/c$, which because feature 132 is closer to CW-TOF camera 20 is less than $\varphi_d(131)$.

At the end of each exposure period $Ex_k$, controller 25 reads photosensor 22 to acquire a frame of the photosensor for the sampling phase offset $\psi_k$. The frame comprises voltages representing the accumulated photocharges and corresponding amounts of reflected light registered by pixels 23 in photosensor 22 during exposure period $Ex_k$ for features in scene 30 respectively imaged on the pixels. Controller 25 may process the voltages provided by the frames for all K sampling phase offsets $\psi_k$, $1 \leq k \leq K$ to extract propagation phase delays $\varphi_d(i,j)$ for respective pixels p(i,j) of pixels 23 and associated distances d(i,j) for features, f(i,j), imaged on pixels p(i,j) as discussed below.

Transmitted light 40, reflected light, such as light 41 and 42 reflected from transmitted light 40 by features 131 and 132, and modulated sensitivity of pixels in photosensor 22 during an exposure period $Ex_k$ are periodic functions, and each may advantageously be expressed as a Fourier cosine series. Intensity of transmitted light 40 as a function of time during exposure period $Ex_k$ may therefore be represented by $$I_k(t)=\Sigma_0^\infty I_{k,n} \cos(n\omega t), \qquad (1)$$

and intensity of light reflected from light 40 by a feature f(i,j) in scene 30 that is imaged by CW-TOF camera 20 on a given pixel p(i,j) of pixels 23 during exposure period $Ex_k$ may be represented by $$R_k(i,j,t)=\Sigma_0^\infty R(i,j)_{k,n} \cos(n\omega t+n\varphi_d(i,j)). \qquad (2)$$

If the sensitivity of pixels 23 in photosensor 22 during exposure period $Ex_k$ is represented by $S_k(t)=\Sigma_0^\infty S_{k,n} \cos(n\omega t+\psi_k)$, the convolution, $CV_k(i,j)\equiv S_k(t)*R_k(i,j,t)$, of $R_k(i,j,t)$ and $S_k(t)$ for pixel p(i,j) may be expressed, $$CV_k(i,j)\equiv S_k(t)*R_k(i,j,t)=\Sigma_0^\infty S_{k,n}R_{k,n}\cos(\psi_k+\varphi_d(i,j)). \qquad (3)$$

Then, if $V_k(i,j)$ is a voltage in a frame of photosensor 22 representing an amount of photocharge accumulated by pixel p(i,j) during exposure period $Ex_k$ acquired following the exposure period, $V_k(i,j,\psi_k)$ may be written, $$V_k(i,j,\psi_k)=\alpha CV_k(i,j)=\alpha\Sigma_0^\infty S_{k,n}R(i,j)_{k,n}\cos(\psi_k+\varphi_d(i,j)), \qquad (4)$$

where $\alpha$ is a proportionality coefficient.

For intensity of transmitted light characterized by a single dominant modulation frequency and/or for which harmonics of the dominant frequency may advantageously be ignored, transmitted light 40 may be approximated by an expression, $$I_k(t)=\Sigma_0^\infty I_{k,n} \cos(n\omega t)\cong I_o+I_1 \cos \omega t, \qquad (5)$$

and light from a feature f(i,j) in scene 30 imaged on a pixel p(i,j) advantageously approximated by an expression, $$R_k(i,j,t)=\Sigma_0^\infty R(i,j)_{k,n}\cos(n\omega t+n\varphi_d(i,j))\cong R_o+R_1 \cos(\omega t+\varphi_d(i,j)). \qquad (6)$$

Assuming that modulation of sensitivity of photosensor 22 during an exposure period $Ex_k$ may be expressed, $$S_k(t)=\Sigma_0^\infty S_{k,n}\cos(n\omega t+\psi_k)\cong S_o+S_1 \cos(\omega t+\psi_k), \qquad (7)$$

the convolution of exposure period $Ex_k$ and light $R_k(i,j,t)$ reflected by a feature f(i,j) in scene 30 and imaged on a pixel 23 p(i,j) becomes, $$CV_k(i,j)=S_oR(i,j)_o+S_1R(i,j)_1\cos(\psi+\varphi_d(i,j)). \qquad (8)$$

Voltage representing the photocharge accumulated by p(i,j) during the exposure period, $$V_k(i,j,\psi_k)=\alpha CV_k(i,j)=\alpha[S_oR(i,j)_o+S_1R(i,j)_1\cos(\psi_k+\varphi_d(i,j))], \qquad (9)$$

which may be written in a form, $$V_k(i,j,\psi_k)=A(i,j)+B(i,j)\cos(\psi_k+\varphi_d(i,j)) \qquad (10)$$

Controller 25 may determine propagation phase delay $\varphi_d(i,j)$ for a feature f(i,j) imaged on pixel p(i,j) in accordance with an expression, $$\varphi_d(i,j) = a\tan[-\Sigma_{k=1}^{k=K} V_k(i,j,\psi_k)\sin(\psi_k)/\Sigma_{k=1}^{k=K} V_k(i,j,\psi_k)\cos(\psi_k)] = a\tan[-\Sigma_{k=1}^{k=K} B(I,j)\cos(\psi_k + \varphi_d(i,j))\sin(\psi_k)/\Sigma_{k=1}^{k=K} B(i,j)\cos(\psi_k + \varphi_d(i,j))\cos(\psi_k)] \quad (11)$$

and distance d(i,j) to feature f(i,j) in accordance with, $$d(i,j) = [c/2\omega)]\varphi_d(i,j) \quad (12)$$

By way of specific example, for feature 131 of object 31 that CW-TOF camera 20 images on pixel 231, controller 25 may determine a propagation phase delay $$\varphi_d(231) = a\tan[\Sigma_{k=1}^{k=K} V_k(231,\psi_k)\sin(\psi_k)/\Sigma_{k=1}^{k=K} V_k(231,\psi_k)\cos(\psi_k)], \quad (13)$$

and distance to the feature, $$d(131) = [c/2\omega]\varphi_d(231). \quad (14)$$

The discussion above referencing features in FIG. 1A assumes absence of MPI and that therefore amounts of photocharge accumulated by pixels 23 during an exposure period $Ex_k$ are generated only by light reflected by features in scene 30 from direct light, that is, light that reaches the features directly from light source 24. However, in general, accumulation of photocharge by pixels in a CW-TOF camera is generally contaminated by photocharge generated by MP light.

Figure 1B:
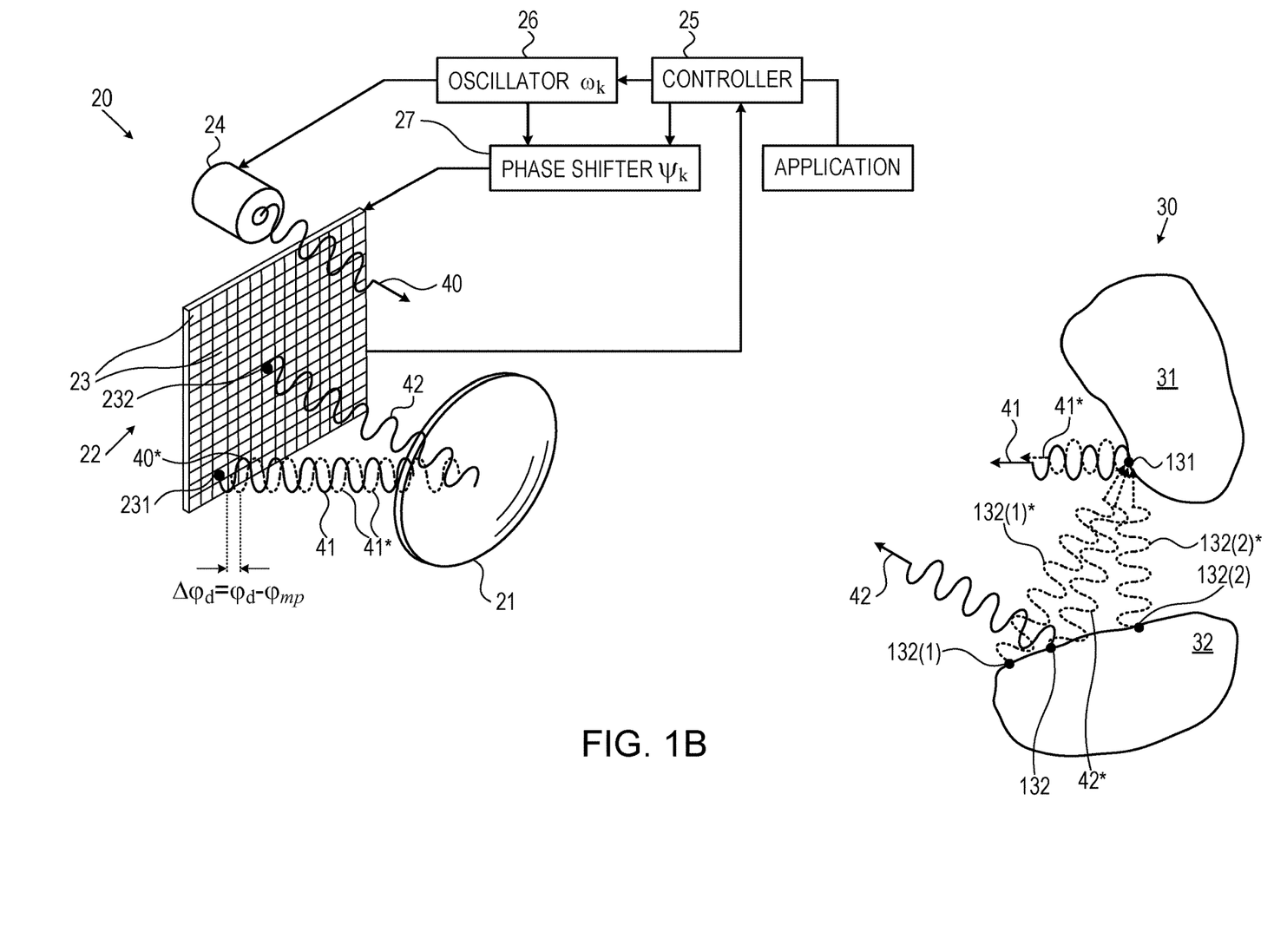
FIG. 1B schematically shows the CW-TOF camera shown in FIG. 1A determining distances to features in the scene in the presence of MPI.

FIG. 1B by way of example schematically shows CW-TOF camera 20 imaging scene 30 in the presence of MPI. The figure illustrates how MPI may affect photocharge accumulated by pixel 231 on which CW-TOF camera 20 images reflected light from feature 131 during an exposure period $Ex_k$ of photosensor 22.

FIG. 1B, schematically shows that some of light 40 transmitted by light source 24 and incident on feature 132 as well as, by way of example, features 132(1) and 132(2) of object 32 is not reflected directly back to CW-TOF camera 20 for imaging the features, but is reflected instead to illuminate feature 131. Light reflected from features 132, 132(1), and 132(2) to illuminate feature 131 is MP light, having traveled multiple distinct path segments from light source 24 to feature 131, and is represented by dashed wavy lines 42*, 132(1)*, and 132(2)* respectively. Some of MP light 42*, 132(1)*, and 132(2)* that is incident on feature 131 is reflected by feature 131 to CW-TOF camera 20 and is imaged on pixel 231 together with direct light from light source 24 reflected by the feature.

Light reflected by feature 131 from transmitted light 40 that directly illuminates feature 131 that CW-TOF camera 20 images on pixel 231 is represented in FIG. 1B, as in FIG. 1A, by light 41. Whereas MP light 42*, 132(1)*, and 132(2)* travel different multipaths from light source 24 to feature 131 and light from each multipath that is reflected by feature 131 to CW-TOF camera 20 reaches pixel 231 generally with a different propagation phase delay, the MP light reflected by feature 131 is, for convenience of presentation, collectively represented in FIG. 1B by a same dashed wavy line 41*. Light 41* is shown displaced back of light 41 in FIG. 1B to indicate that reflected MP light 41* is retarded by propagation phase delay greater than a propagation phase delay characterizing direct light 41.

Assume that a given feature f(i,j) in scene 30 that CW-TOF camera 20 images on pixel p(i,j) receives MP light reflected from transmitted light 40 by features f(i',j') in the scene for which i≠i, or j'≠j. When feature f(i,j) reflects the MP light it receives to CW-TOF camera 20 during an exposure period $Ex_k$, the reflected MP light contributes to photocharge accumulated by pixel p(i,j) during the exposure period, and thereby to voltage $V_k(i,j,\psi_k)$ representing the accumulated photocharge. Since photocharge generated in a photosensor pixel p(i,j) by light incident on the pixel is generally a linear function of the incident light, an amount of photocharge accumulated by pixel p(i,j) during exposure period $Ex_k$, is a sum of photocharge generated by reflected direct light and reflected MP light incident on the pixel. By way of example, for feature 131 shown in FIG. 1B photocharge generated in pixel 231 by incident light during an exposure period $Ex_k$ may be a sum of photocharge generated by reflected direct light 41 and reflected MP light 41*. Reflected light 41*, as noted above, includes light reflected from MP light 132(1)*, 132(2)* and 41* reaching feature 131 from features 132(1), 132(2) and 132 respectively.

Therefore, for feature f(i,j) imaged by CW-TOF camera 20 on pixel p(i,j), voltage $V_k(i,j,\psi_k)$ representing photocharge accumulated by the pixel during exposure period $Ex_k$ is a sum of a voltage, $V_k(i,j,\psi_k)_D$, representing photocharge accumulated responsive to direct light that f(i,j) reflects and CW-TOF camera 20 images on p(i,j) and a voltage, $V_k(i,j,\psi_k)_{mp}$, representing photocharge, "MP photocharge", accumulated responsive to MP light that f(i,j) reflects and the camera images on pixel p(i,j). Voltage $V_k(i,j,\psi_k)$ may therefore be given by an expression $$V_k(i,j,\psi_k) = V_k(i,j,\psi_k)_D + V_k(i,j,\psi_k)_{mp} \quad (15)$$

In expression (15), $V_k(i,j,\psi_k)_D$ is given by expression (10) above and may be written, $$V_k(i,j,\psi_k)_D = [A(i,j) + B(i,j)\cos(\psi_k + \varphi_d(i,j))]. \quad (16)$$

Voltage $V_k(i,j,\psi_k)_{mp}$ may similarly be given by an expression $$V_k(i,j,\psi_k)_{mp} = \Sigma_{i',j'}[A_{mp}(i,j,i',j') + B(i,j,i',j')_{mp}\cos(\psi_k + \varphi_d(i,j,i',j'))], \quad (17)$$

where the sum in expression (17) is taken over indices of features f(i',j') that illuminate feature f(i,j) with MP light during exposure period $Ex_k$. The phase $\varphi_d(i,j,i',j')$ in (17) is a propagation phase delay that MP light from feature f(i',j') experiences in propagating from CW-TOF camera 20 to f(i',j'), from f(i',j') to f(i,j), and from f(i,j) back to CW-TOF camera 20.

It is readily seen from expression (17) that reflected MP light adds MP photocharge to photocharge generated by reflected direct light from feature f(i,j), and generates error in propagation phase delay $\varphi_d(i,j)$, and thereby distance d(i,j) to feature f(i,j) that CW-TOF camera 20 may determine based on the propagation phase delay.

Figure 2:
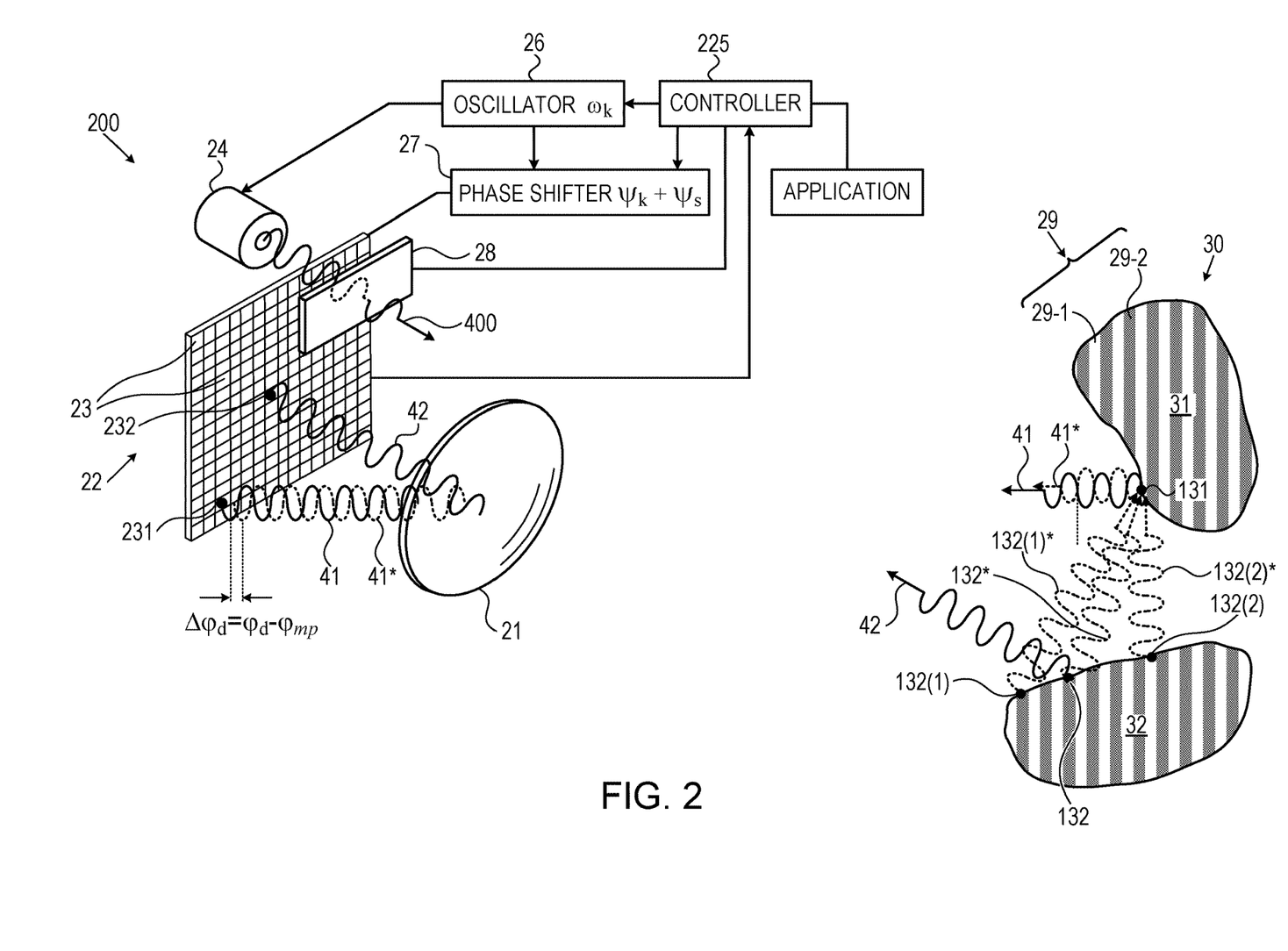
FIG. 2 shows a CW-TOF camera configured to exhibit enhanced resistance to MPI error determining distance to features in the scene shown in FIGS. 1A and 1B, in accordance with an embodiment of the disclosure.

FIG. 2 schematically shows a CW-TOF camera 200 in accordance with an embodiment of the disclosure configured to reduce error due to MP photocharge. CW-TOF 200 optionally comprises components similar to components comprised in CW-TOF camera 20, but may have a controller 225 that replaces controller 25 comprised in CW-TOF 20, and in addition may have an optical pattern generator 28. CW-TOF camera 200 is shown imaging scene 30 shown in FIGS. 1A and 1B.

To provide a range image of scene 30, controller 225 operates CW-TOF camera 200 to acquire an image of the scene during each of K exposure periods $Ex_k$ (1≤k≤K) of photosensor 22 for which the controller controls oscillator 26 and light source 24 to transmit light 40 modulated at frequency ω to illuminate the scene. For a k-th exposure period $Ex_k$, controller 225 controls photosensor 22 and phase shifter 27 to modulate sensitivity of pixels p(i,j) at a frequency ω but phase shifted by a sampling phase offset $\psi_k$, where $\psi_k = 2\pi(k-1)/K$, modified by a sequence of N "perturbation phase shifts" $\lambda_n$ (1≤n≤N), where $\lambda_n = 2\pi(n-1)/N$, and n and N are integers. For a sampling phase offset $\psi_k$, controller 225 may modulate sensitivity of photosensor 22 during exposure period $Ex_k$ for a sequence of N equal perturbation time periods $\tau_n$ ($1 \leq n \leq N$) for which sensitivity of photosensor 22 for a period $\tau_n$ is equal to, $$S_{k,n}(t)=[S_o+S_1 \cos(\omega t+\psi_k+\lambda_n)] \tag{18}$$

During exposure period $Ex_k$ controller also 225 controls optical pattern generator 28 to modulate transmitted light 40 to generate structured light 400 that illuminates scene 30 and produces a corresponding structured illumination pattern of features f(i,j) in the scene. The structured illumination pattern comprises a plurality of regions, hereinafter also referred to as illumination zones, of scene 30. Illumination zones may be of a same or different type. Features f(i,j) of scene 30 in different types of illumination zones are illuminated differently by structured light 400 during exposure period $Ex_k$. Features f(i,j) in a same illumination zone and features f(i,j) in different illumination zones of a same type are illuminated similarly during the exposure period. Illumination zones may be discrete illumination zones delimited and separated by relatively well-defined boundaries in a scene imaged by CW-TOF camera 200 and across which illumination exhibits relatively abrupt changes. Illumination zones may be continuous illumination zones that do not exhibit relatively well-defined boundaries across which illumination exhibits relatively abrupt changes. Continuous illumination zones in scene 30 may for example exhibit change in illumination that is a relatively gradual function of location characterized by continuous spatial gradients in intensity or wavelength of illumination. Gradients may for example be generated by time dependent change of illumination of different regions of scene 30 that are continuous rather than discrete functions of location of the regions. Different continuous illumination zones may be characterized by different parameters, such as phase of temporal development, defining functions characterizing illumination they respectively receive from structured light 400.

A structured illumination pattern simultaneously comprises at least two different types of illumination zones. For example, structured light 400 that optical pattern generator 28 provides may generate a structured illumination pattern simultaneously comprising two different types of illumination zones—bright illumination zones and dark illumination zones, the bright illumination zones having features f(i,j) that receive more light from pattern generator 28 than the dark illumination zones. The bright and dark illumination zones may comprise bright strips of illuminated features f(i,j) interleaved with dark strips of non-illuminated features f(i,j). The bright and dark illumination zones may comprise a speckle pattern of brighter and darker "islands" of features f(i,j) or a tiling of brighter and darker regions. A structured illumination pattern may comprise more than two illumination zones and may for example have three illumination zones each receiving different intensity or wavelength of transmitted light from pattern generator 28. In FIG. 2, by way of example, optical pattern generator 28 is shown generating structured light 400 that produces a structured illumination pattern 29 comprising discrete illumination zones that are bright and dark strips 29-1 and 29-2 respectively.

Pattern generator 28 may be any of various devices for generating structured light and may for example comprise an array of micromirrors, an array of liquid crystal cells, and/or an optical scanner configured to receive light 40 and direct portions of the received light to generate structured light that illuminates scene 30 with desired structured illumination patterns. Alternatively and/or additionally light source 40 may comprise an array of independently controllable lasers and/or light emitting diodes (LEDs), which controller 225 may control to generate a desired structured illumination pattern on scene 30. It is noted that whereas light source 24 and pattern generator 28 shown in FIG. 2 are discussed as separate entities, the term light source may be used to refer generically to any optical apparatus operable to provide structured light to illuminate a scene with a structured illumination pattern in accordance with an embodiment of the disclosure In accordance with an embodiment, during exposure period $Ex_k$ controller 225 controls pattern generator 28 to modify structured light 400 to modify light illuminating features in a given illumination zone in accordance with a sequence of multiplicative optical pattern modifiers in synchrony with the sequence of perturbation phase shifts $\lambda_n$. Features in different types of illumination zones may be illuminated in synchrony with perturbation phase shifts $\lambda_n$ with different sequences of optical pattern modifiers. Sequences of optical pattern modifiers in accordance with an embodiment may be different because they are different sequences of same optical modifiers or sequences of different optical modifiers. An optical pattern modifier may be said to modify structured light 400 or to modify corresponding illumination of features in scene 30 that receive the structured light modified by the optical pattern modifier.

Let a number of optical pattern modifiers be the same as the number of different perturbation phase shifts and be represented by $P_z$ ($1 \leq z \leq Z$) where $Z=N$. Optical pattern modifiers having different subscripts z may have a same functional form but are distinguished because they are used during different perturbation time periods $\tau_n$. Since a sequence of optical pattern modifiers $P_z$ is different for different illumination zones, which optical pattern modifier $P_z$ is synchronized with a given perturbation phase shift $\lambda_n$ during exposure period $Ex_k$ depends on the illumination zone as well as the perturbation phase shift. Illumination that a given feature f(i,j) in scene 30 receives during the exposure period depends on the type of illumination zone in which it is located, which is a function of its indices (i,j). Therefore if $I(i,j,n,t)_{400}$ represents intensity of light that feature f(i,j) receives during a perturbation time period $\tau_n$ of exposure period $Ex_k$, for which sensitivity modulation of photosensor 22 is phase shifted by a phase ($\omega_k+\lambda_n$), the intensity may be written, $$I(i,j,n,t)_{400}=P_{z(i,j,n)}(I_o+I_1 \cos \omega t), \tag{18}$$

where the dependence of the subscript z expresses the dependence of optical pattern modifier $P_z$ on index n and the illumination zone.

Intensity of direct light reflected by a feature f(i,j) from light 400 that reaches the feature directly from optical pattern generator 28 and is imaged on pixel p(i,j) by CW-TOF camera 200 during a period $\tau_n$ of exposure period $Ex_k$ may be written, $$R_{k,n}(i,j,t)=P_{z(i,j,n)}(R_o+R_1 \cos(\omega t+\varphi_d(i,j))). \tag{20}$$

Light from indirect, MP light, from a feature f(i',j') that illuminates and is reflected by feature f(i,j) which CW-TOF camera 200 images on pixel p(i,j) may be written, $$R_{mp,k,n}(i,j,i',j',t)=P_{z(i',j',n)}(R_{mp,o}(i,j,i',j')+R_{mp,1}(i,j,i',j'))). \tag{21}$$

Voltage $V_k(i,j,\psi_k)$ representing photocharge accumulated by pixel p(i,j) responsive to a convolution of direct and MP light from feature f(i,j) that CW-TOF camera 200 images on p(i,j) is, as given by the expression (15), $V_k(i,j,\psi_k)=V_k(i,j,\psi_k)_D+V_k(i,j,\psi_k)_{mp}$, but with $V_k(i,j,\psi_k)_D$ and $V_k(i,j,\psi_k)_{mp}$ modified through dependence on $P_{z(i,j,n)}$ and perturbation phases $\lambda_n$. In particular, expression (16) for direct voltage $V_k(i,j,\psi_k)_D$ representing direct photocharge is modified and becomes, $$V_k(i,j,\psi_k)_D = \Sigma_n P_{z(i,j,n)}[A(i,j)+B(i,j)\cos(\psi_k+\lambda_n+\varphi_d(i,j))]. \quad (22)$$

And expression (17) for MP voltage $V_k(i,j,\psi_k)_{mp}$ representing MP photocharge is modified to an expression, $$V_k(i,j,\psi_k)_{mp} = \Sigma_n \Sigma_{i',j'} P_{z(i,j,n)}[A_{mp}(i,j,i',j') + B(i,j,i',j')_{mp} \cos(\psi_k+\lambda_n+\varphi_d(i,j,i',j'))]. \quad (23)$$

In an embodiment, a spatial pattern for structured light that optical pattern generator 28 produces is chosen so that the sum over indices i',j' in expression (23) substantially satisfies a constraint, $$\Sigma_n \Sigma_{i',j'} P_{z(i',j',n)} B(i,j,i'j')_{mp} \cos(\psi_k+\lambda_n+\varphi_d(i,j,i',j')) = 0 \quad (24)$$

In an embodiment, to satisfy constraint (24) controller 225 controls optical pattern generator 28 to configure structured light pattern 400 so that the sum $\Sigma_{i',j'}[P_{z(i',j',n)}B(i,j,i'j')_{mp}]$ over indices i',j' is "homogenized", and substantially equal to a constant for a given p(i,j), and independent of n for distances between features f(i',j') in scene 30 that illuminate feature f(i,j) with MP light, and for which $\varphi_d(i,j,i',j')$ is substantially the same.

In an embodiment, to provide a homogenizing light pattern, controller 225 may control optical pattern generator 28 so that structured light 400 illuminates scene 30 to produce illumination pattern 29 schematically shown in FIG. 2 comprising strips of illuminated, "bright", features f(i,j) interleaved with strips of non-illuminated, "dark", features f(i,j) in the scene and for which adjacent strips alternate between being bright and dark with change in subscript n. Pitch of the dark and bright strips is determined to "homogenize" MP light from features f(i',j') that reflect MP light to a feature f(i,j) so that the sum $\Sigma_{i',j'}[P_{z(i',j',n)}\cdot B(i,j,i'j')_{mp}]$ does not change and is substantially independent of index n. For example bright and dark strips in scene 30 may be imaged on corresponding strips of pixels 23 in photosensor 22 that are advantageously a few pixels wide. Optionally, the strips of pixels 23 may by way of example be less than 10 pixels wide. In an embodiment the strips may be between 2 and 5 pixels wide. Optionally, the strips are 4 pixels wide.

For voltage $V_k(i,j,\psi_k)$ for which expressions (15), (22), and (23) are valid, $V_k(i,j,\psi_k)$ may be written, $$V_k(i,j,\psi_k) = \Sigma_n P_{z(i,j,n)}[A(i,j)+B(i,j)\cos(\psi_k+\lambda_n+\varphi_d(i,j))] + \Sigma_n \Sigma_{i',j'} P_{z(i',j',n)}[A_{mp}(i,j,i'j')] \quad (25)$$

Noting, as discussed above with respect to the constraint (24), that $\Sigma_{i',j'}[P_{z(i',j',n)}B(i,j,i'j')_{mp}]$ is independent of n for a given pixel, that $\Sigma_{i',j'}P_{z(i',j',n)}[A_{mp}(i,j,i'j')]$ is therefore also constant and substantially independent of n for a given pixel p(i,j) and may be written, $$\Sigma_{i',j'} P_{z(i',j',n)}[A_{mp}(i,j,i',j')] = C_{mp}(i,j). \quad (26)$$

Using expression (26) and setting $$\Sigma_n P_z(i,j,n) A(i,j) = C_D(i,j), \quad (27)$$

expression (25) for $V_k(i,j,\psi_k)$ may be written, $$V_k(i,j,\psi_k) = C_D(i,j) + \Sigma_n P_{z(i,j,n)} B(i,j) \cos(\psi_k+\lambda_n+\varphi_d(i,j)) + NC_{mp}(i,j), \quad (28)$$

where, as noted above ($1 \leq n \leq N$).

In an embodiment $P_{z(i,j,m)}$ is determined so that, $$\Sigma_n P_{z(i,j,n)} B(i,j) \cos(\psi_k+\lambda_n+\varphi_d(i,j)) = B^*(i,j) \cos(\psi_k+\varphi_d(i,j)+\xi(i,j)) \quad (29)$$

and as a result expression (28) for voltage $V_k(i,j,\psi_k)$ becomes $$V_k(i,j,\psi_k) = C_D(i,j) + NC_{mp}(i,j) + B^*(i,j) \cos(\psi_k+\varphi_d(i,j)+\xi(i,j)). \quad (30)$$

In expressions (29) and (30) the term $\xi(i,j)$ represents a phase, which may also be referred to as a "pattern phase" or a "spatial phase", generated by structure of the structured illumination pattern and changes in the structure that are synchronized with the sequence of the perturbation phase shifts $\lambda_n$ during an exposure period $Ex_k$. The pattern phase $\xi(i,j)$ is generated by a phase displacement between the sequence of optical pattern modifiers associated with the illumination zone in which pixel p(i,j) is located and the sequence of perturbation phase shifts $\lambda_n$. The pattern phase may be different for different illumination zones and may result in pixels in different types of illumination zones accumulating different quantities of photocharge for features in scene 30 at a same distance from CW-OF camera 200. The different amounts of photocharge and consequential different corresponding voltages $V_k(i,j,\psi_k)$ may be due to the sequences of pattern modifiers $P_{z(i,j,n)}$ associated with the different illumination zones synchronizing differently with the same sequence of perturbation phase shifts. It is noted that expression (30) is a generalization of expression (28) and that evaluating expression (13) for voltages $V_k(i,j,\psi_k)$ gives $\varphi_d(i,j)+\xi(i,j))$ rather than $\varphi_d(i,j)$. Values for $\xi(i,j)$ may be determined in a calibration procedure of CW-TOF camera 20 and stored in a memory of controller 225. The calibration procedure for CW-TOF camera 20 may by way of example comprise imaging features at known distances from the camera.

Expression (30) shows that MP light contributes only a constant term, $NC_{mp}(i,j)$, which is independent of sampling phase offset $\psi_k$, to voltage $V_k(i,j,\psi_k)$ that CW-TOF camera 200 provides for pixel p(i,j) and feature f(i,j) imaged on the pixel. Terms that are independent of sampling phase offset $\psi_k$ do not contribute to propagation phase delay $\varphi_d(i,j)$ determined from expression (11). CW-TOF camera 20 configured to image a scene using perturbation phase shifts $\lambda_n$ in synchrony with optical pattern modifiers $P_{z(i,j,n)}$ in accordance with an embodiment of the disclosure therefore provides a range image of the scene that is characterized by reduced MPI error.

Controller 225 may be configured to control phase shifter 27 and optical pattern generator to provide different sets, hereinafter also referred to as anti-MPI (AMPI) sets, of perturbation phase shifts $\lambda_n$ and corresponding optical pattern modifiers $P_{z(i,j,m)}$ so that voltage $V_k(i,j,\psi_k)$ has a form given by expression (30). For a given AMPI set, optical pattern modifiers $P_{z(i,j,n)}$ modify light from light source 24 to produce spatially structured light that may partition scene 30 into illumination zones optionally comprising a plurality of N different types of illumination zones. And as noted above for a same sequence of perturbation phase shifts $\lambda_n$, structured light 400 may illuminate different illumination zones in scene 30 with light modified by a different sequence of optical pattern modifiers $P_{z(i,j,n)}$. In an embodiment the different sequences of optical pattern modifiers $P_{z(i,j,n)}$ may be cyclic permutations of the same optical pattern modifiers.

For example, if for pixels p(i,j) imaging features f(i,j) in a first type of illumination zone, CW-TOF camera 200 pairs perturbation phase shifts in a sequence of perturbation phase shifts $\lambda_1, \lambda_2, \lambda_3, \lambda_4$, with respective optical pattern modifiers in a sequence $P_1, P_2, P_3, P_4$, for pixels p(i,j) in a second, different type of illumination zone, the same sequence of perturbation phase shifts may be paired respectively with pattern modifiers in the sequence $P_4, P_1, P_2, P_3$. The sequence of pattern modifiers associated with the second illumination zone is a cyclic permutation of the sequence of pattern modifiers associated with the first illumination zone. Hereinafter arguments (i,j) for an optical pattern modifier $P_1(i,j)$ may be omitted, it being understood that the optical pattern modifier is associated with pixels in an illumination zone with which the pattern modifier is associated.

By way of example, in an embodiment an AMPI set may comprise N=2 perturbation phase shifts $\lambda_n$ with $\lambda_1=2\pi(n-1)/N=(n-1)360°/N=0°$ and $\lambda_2=180°$, and two optical pattern modifiers $P_1$ and $P_2$, which may be binary constants having values $P_1=1$ and $P_2=0$. Scene 30 may comprise two types of illumination zones, corresponding to bright and dark regions 29-1 and 29-2 shown in FIG. 2 and having pattern phases $\xi(i,j)$ equal to 0° and 180° respectively. Let the two types of illumination zones be noted as Z1 and Z2. During an exposure period $Ex_k$, the illumination zones alternate between being bright and dark: when Z1 is bright, Z2 is dark; and when Z1 is dark, Z2 is bright. The zones are distinguished by the sequences of optical pattern modifiers $(P_1, P_2)$ that are synchronized with the sequences of perturbation phase shifts $(\lambda_1, \lambda_2)$. For Z1 having pattern phase 0° the sequence $(\lambda_1, \lambda_2)$ may be synchronized with the sequence $(P_1, P_2)$. The combination of matched sequences may conveniently be denoted by a form [Z1: $(\lambda_1, \lambda_2)$; $(P_1, P_2)$]. Inserting values for the perturbation phase shifts and optical pattern modulators, the matched sequences become [Z1: (0°, 180°); (1, 0)]. For Z2 having pattern phase 180° the sequence $(\lambda_1, \lambda_2)$ may be synchronized with the reversed sequence, $(P_2, P_1)$, of optical pattern modifiers so that [Z2: $(\lambda_1, \lambda_2)$; $(P_2, P_1)$] and [Z2: (0°, 180°); (0,1)].

For a pixel p(i,j) imaging a feature f(i,j) that is located in an illumination zone type Z1, expression (28) may be evaluated for the matched sequences [Z1: (0°, 180°); (1,0)] to provide a voltage $V_k(i,j,\psi_k)$ that CW-TOF camera 200 provides for f(i,j) and sampling phase offset $\psi_k$, $$V_k(i,j,\psi_k,Z1)=C_D(i,j)+2C_{mp}(i,j)+1\cdot B(i,j)\cos(\psi_k+0°+\varphi_d(i,j))+0\cdot B(i,j)\cos(\psi_k+180°+\varphi_d i,j))=C_D(i,j)+2C_{mp}(i,j)+B(i,j)\cos(\psi_k+\varphi_d(i,j)). \quad (31)$$

In the expression Z1 is added to the argument of voltage $V_k(i,j,\psi_k,Z1)$ to explicitly indicate that the voltage is for a feature f(i,j) in zone Z1. Similarly, for a pixel p(i,j) imaging a feature f(i,j) located in an illumination zone type Z2, matched sequences [Z2: (0°, 180°); (0,1)] result in, $$V_k(i,j,\psi_k,Z2)=C_D(i,j)+2C_{mp}(i,j)+0\cdot B(i,j)\cos(\psi_k+0°+\varphi_d(i,j))+1\cdot B(i,j)\cos(\psi_k+180°+\varphi_d(i,j))=C_D(i,j)+2C_{mp}(i,j)-B(i,j)\cos(\psi_k+\varphi_d(i,j)). \quad (32)$$

It is noted that in the above evaluations in expression (31) and (32) pattern phases 0° and 180 do not explicitly appear because they are accounted for by the reverse orderings, $(P_1, P_2)$ and $(P_2, P_1)$, of optical pattern modifiers synchronized with the same sequence of perturbation phase shifts (0°, 180°) for illumination zones Z1 and Z2 respectively and reversal of sign before the last term in the expressions.

From expressions (31) and (32) it is seen that CW-TOF camera 200 using the matched sequences of perturbation phase shifts and optical pattern modifiers for Z1 and Z2 provides a voltage $V_k(i,j,\psi_k)$ for a feature f(i,j) and sampling phase offset $\psi_k$ having a same form of dependence on the sampling phase offset and propagation phase delay $\varphi_d(i,j)$ as shown in expression (10). Furthermore, MPI only contributes to constant terms $NC_{mp}(i,j)$ in expressions (31) and (32). Since as noted above, constants in expression (10) do not contribute to propagation phase delay $\varphi_d(i,j)$ determined in accordance with expression (11), voltages $V_k(i,j,\psi_k)$ provided by CW-TOF camera 200 provide propagation phase delays $\varphi_d(i,j)$ and therefrom corresponding distances d(i,j) to features f(i,j) in scene 30 that are substantially free of error generated by MPI.

In an embodiment, an AMPI set may comprise N=3 perturbation phase shifts $\lambda_n$ having respective values 0°, 120°, and 240°, three binary optical pattern modifiers $P_1=1$, $P_2=0$, $P_3=0$, and three types of illumination zones Z1, Z2, and Z3 having respective pattern phases 0°, 120°, and 240°. The illumination zones may be defined by [Z1: (0°, 120°, 240°); (1, 0, 0)], [Z2: (0°, 120°, 240°); (0, 1, 0)], [Z3:(0°, 120°, 240°); (0, 0, 1)]. Similarly to evaluating expression (28) for zones Z1 and Z2 above, evaluating expression (28) for voltages provided by CW-TOF camera 200 for features f(i,j) in the three zones with $C(i,j)=C_D(i,j)+NC_{mp}(i,j)$ provides:

$$V_k(i,j,\psi_k,Z1)=C(i,j)+1\cdot B(i,j)\cos(\psi_k+0°+\varphi_d(i,j))+0\cdot B(i,j)\cos(\psi_k+120°+\varphi_d(i,j))+0\cdot B(i,j)\cos(\psi_k+240°+\varphi_d(i,j))=C(i,j)+B(i,j)\cos(\psi_k+\varphi_d(i,j)). \quad (33)$$

$$V_k(i,j,\psi_k,Z2)=C(i,j)+0\cdot B(i,j)\cos(\psi_k+0°+\varphi_d(i,j))+1\cdot B(i,j)\cos(\psi_k+120°+\varphi_d(i,j))+0\cdot B(i,j)\cos(\psi_k+240°+\varphi_d(i,j))=C(i,j)+B(i,j)\cos(\psi_k+\varphi_d(i,j)+120°). \quad (34)$$

$$V_k(i,j,\psi_k,Z3)=C(i,j)+1\cdot B(i,j)\cos(\psi_k+0°+\varphi_d(i,j))+0\cdot B(i,j)\cos(\psi_k+120°+\varphi_d(i,j))+B(i,j)\cos(\psi_k+240°+\varphi_d(i,j))=C(i,j)+B(i,j)\cos(\psi_k+\varphi_d(i,j)+240°). \quad (35)$$

Evaluating expression (28) in accordance with an embodiment for an N=4 perturbation phase AMPI sets having four binary pattern modifiers, and four illumination zones Z1, ... Z4 for which [Z1: (0°, 90°, 180°, 270°); (1, 0, 0,1)], [Z2: (0°, 90°, 180°, 270°); (1, 1, 0,0)], [Z2: (0°, 90°, 180°, 270°); (0, 1, 1,0)], [Z2: (0°, 90°, 180°, 270°); (0, 0, 1,1)], and having pattern phases that are plus or minus 45° provides $$V_k(i,j,\psi_k,Z1)=C(i,j)+\sqrt{2}B(i,j)\cos(\psi_k+\varphi_d(i,j))-45°,$$

$$V_k(i,j,\psi_k,Z2)=C(i,j)+\sqrt{2}B(i,j)\cos(\psi_k+\varphi_d(i,j))+45°,$$

$$V_k(i,j,\psi_k,Z3)=C(i,j)+\sqrt{2}B(i,j)\cos(\psi_k+\varphi_d(i,j))-45°, \text{ and}$$

$$V_k(i,j,\psi_k,Z4)=C(i,j)+\sqrt{2}B(i,j)\cos(\psi_k+\varphi_d(i,j))+45°. \quad (36)$$

An AMPI set in accordance with an embodiment may have N=2 perturbation phases and two illumination zones having respective pattern phases 0°, 180°, and defined by [Z1: (0°, 180°; (1, 0.5-E)] and [Z2: (0°, 180°); (0, 0.5+E)], where 0.5 is a DC level and E<0.5. The AMPI sets provide $$V_k(i,j,\psi_k,Z1)=C(i,j)+(0.5+E)B(i,j)\cos(\psi_k+\varphi_d(i,j)), \text{ and}$$

$$V_k(i,j,\psi_k,Z2)=C(i,j)+(0.5+E)B(i,j)\cos(\psi_k+\varphi_d(i,j)). \quad (37)$$

An AMPI set in accordance with an embodiment may have N>2 perturbation phases $\lambda_n=(n-1)360°/N$, $(0\le n\le N)$ and two illumination zones having respective pattern phases 0°, 180°, and defined by
[Z1:$(\lambda_1, \lambda_2, \ldots \lambda_N)$;(1+cos $\lambda_1$, 1+cos $\lambda_2$, ..., 1+cos $\lambda_N$)] and
[Z2:$(\lambda_1, \lambda_2, \ldots \lambda_N)$; (1−cos $\lambda_1$, 1−cos $\lambda_2$, ..., 1−cos $\lambda_N$)].
The AMPI sets provide, $$V_k(i,j,\psi_k,Z1)=C(i,j)+(N/2)B(i,j)\cos(\psi_k+\varphi_d(i,j)), \text{ and}$$

$$V_k(i,j,\psi_k,Z2)=C(i,j)-(N/2)B(i,j)\cos(\psi_k+\varphi_d(i,j)) \quad (38)$$

An AMPI set in accordance with an embodiment may have N=2 perturbation phases, 0°, 180° sinusoidal optical pattern modifiers $P_n$, and two illumination zones having a difference in pattern phase $\xi(i,j)$ and defined by,
[Z1:(0°, 180°); (1+k cos(0°+$\xi$(i,j))), (1+k cos(180°+$\xi$(i,j)))], and
[Z2:(0°, 180°); (1+k cos(180°+$\xi$(i,j))), (1+k cos(0°+$\xi$(i,j)))]

The AMPI sets provide $$V_k(i,j,\psi_k,Z1)=C(i,j)+2\ kB(i,j)\cos(\xi_L)\cos(\psi_k+\varphi_d(i,j)),$$
and $$V_k(i,j,\psi_k,Z2)=C(i,j)-2\ kB(i,j)\cos(\xi_L)\cos(\psi_k+\varphi_d(i,j)) \quad (39)$$

An AMPI set in accordance with an embodiment may have N>2 perturbation phases $\lambda_n=(n-1)360°/N$, $(0 \le n \le N)$, N sinusoidal optical pattern modifiers $P_n$, and a pattern phase $\xi(i,j)$ which is a continuous function of location in scene 30 that defines a structured illumination pattern for which illumination of features f(i,j) in the scene changes continuously as a function of location of the features. For example, $\xi(i,j)$ may be a continuous function of one of index i, and index j, with at any given time, features f(i,j) imaged on a pixel p(i,j) in a same row or column in photosensor 22 having a same intensity of illumination, and features in adjacent rows or columns having different intensities of illumination so that illumination of scene 30 appears to have a one dimensional gradient. Optionally, the gradient is a two dimensional gradient generated by a pattern phase $\xi(i,j)$ that is a continuous function of both indices i and j. Each value of pattern phase $\xi(i,j)$ may be considered to define an illumination zone. By way of example optical pattern modifiers may be harmonic function optionally defining an AMPI set of a form $[(\lambda_1, \lambda_2, \ldots \lambda_N)); (1+k \cos(\lambda_1+\xi(i,j))), (1+k \cos(\lambda_2+\xi(i,j))), \ldots, (1+k \cos(\lambda_N+\xi(i,j)))]$, For each feature f(i,j) imaged on a pixel 23 p(i,j) the AMPI set provides a voltage $V_k(i,j,\psi_k)$ relatively free of MPI given by an expression, $$V_k(i,j,\psi_k)=C(i,j)+(N/2)kB(i,j)\cos(\psi_k+\varphi_d(i,j)+\xi(i,j)), \quad (40)$$

Similarly, an AMPI set in accordance with an embodiment may have N>2 perturbation phases $\lambda_n=(n-1)360°/N$, $(0 \le n \le N)$, N sinusoidal optical pattern modifiers $P_n$ and continuous illumination zones defined by
$[(\lambda_1, \lambda_2, \ldots \lambda_N)); (1+\cos \lambda_1 \cos \xi_L), (1+\cos \lambda_2 \cos \xi_L), \ldots, (1+\cos \lambda_N \cos \xi_L)]$ and
That provides for a feature f(i,j)

$$V_k(i,j,\psi_k)=C(i,j)+(N/2)B(i,j)\cos \xi_L \cos(\psi_k+\varphi_d(i,j)) \quad (41)$$

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A continuous wave time of flight (CW-TOF) camera operable to determine distances to features in a scene, the CW-TOF camera comprising:
   a light source operable to transmit light to illuminate the scene;
   a photosensor having pixels configured to register amounts of light reflected by features in the scene from the transmitted light; and
   a controller configured to:
      control the light source to transmit structured light modulated at a modulation frequency to illuminate the scene with a structured illumination pattern, wherein the structured illumination pattern comprises three illumination zones, wherein each of the three illumination zones comprises different intensity or wavelength of transmitted light;
      turn on the photosensor for an exposure period to register light reflected by the features from the transmitted structured light;
      modulate sensitivity of the photosensor during the exposure period at the frequency of modulation of the transmitted light but phase shifted relative to phase of the transmitted light by a sampling phase offset modified by a sequence of perturbation phase shifts $\lambda_n$;
      control the light source to modify the modulated structured light with a sequence of optical pattern modifiers in synchrony with the sequence of perturbation phase shifts; and
      determine distances to the features based on the light registered by the pixels.

2. The CW-TOF camera according to claim 1 wherein the structured illumination pattern generated by the structured light comprises a plurality of illumination zones comprising at least two different types of illumination zones and wherein during the exposure period features in the scene located in a same illumination zone and features in the scene located in different illumination zones of a same type are illuminated in accordance with a same sequence of optical pattern modifiers and features in the scene located in different types of illumination zones are illuminated in accordance with different sequences of optical pattern modifiers.

3. The CW-TOF camera according to claim 2 wherein the sequences of optical pattern modifiers for the different types of illumination zones are chosen so that multipath (MP) light that a given feature in the scene receives from other features in the scene is substantially the same for each perturbation phase shift in the sequence of perturbations that modify structured light that the feature receives from the light source.

4. The CW-TOF camera according to claim 3 wherein a pitch between different types of illumination zones is determined so that MP light that a given feature in the scene receives from other features in the scene is substantially the same for each perturbation phase shift in the sequence of perturbations that modify structured light that the feature receives from the light source.

5. The CW-TOF camera according to claim 4 wherein the different types of illumination zones are discrete illumination zones that are contiguous along boundaries.

6. The CW-TOF camera according to claim 5 wherein the optical pattern modulators are multiplicative constants.

7. The CW-TOF camera according to claim 6 wherein the constants are binary constants.

8. The CW-TOF camera according to claim 7 wherein the sequences of optical pattern modifiers associated with different illumination zones are cyclic permutations of each other.

9. The CW-TOF camera according to claim 8 wherein a number of perturbation phase shifts is equal to two and the sequence of perturbation phase shifts is (0°, 180°).

10. The CW-TOF camera according to claim 9 wherein the illumination zones comprise two different types of illumination zones, Z1 and Z2, for which the synchronized sequences of perturbation phase shifts and optical pattern modifiers during an exposure period are respectively [Z1: (0°, 180°); (1, 0)] and [Z2: (0°, 180°); (0, 1)], where in a set of brackets the first entry followed by a colon identifies the illumination zone, and the entries following the colon give the sequence of perturbation phase shifts and synchronized sequence of optical pattern modifiers for the identified zone respectively.

11. The CW-TOF camera according to claim 8 wherein a number of perturbation phase is equal to three and the sequence of perturbation phase shifts is (0°, 120°, 240°).

12. The CW-TOF camera according to claim 11 wherein the illumination zones comprise three different types of illumination zones, Z1, Z2, and Z3, for which the synchronized sequences of perturbation phase shifts and optical pattern modifiers during an exposure period are respectively [Z1: (0°, 120°, 240°); (1, 0, 0)], [Z2: (0°, 120°, 240°); (0, 1, 0)], and [Z3: (0°, 120°, 240°); (0, 0, 1)].

13. The CW-TOF camera according to claim 8 wherein a number of perturbation phase shifts during an exposure period is equal to four and the sequence of perturbation phase shifts is (0°, 90°, 180°, 270°).

14. The CW-TOF camera according to claim 13 wherein the illumination zones comprise four different types of illumination zones, Z1, Z2, Z3 and Z4 for which the synchronized sequences of perturbation phase shifts and optical pattern modifiers during an exposure period are respectively [Z1: (0°, 90°, 180°, 270°) (1, 0, 0, 1)], [Z2: (0°, 90°, 180°, 270°); (1, 1, 0, 0)], [Z3: (0°, 90°, 180°, 270°); (0, 1, 1, 0)] and [Z4: (0°, 90°, 180°, 270°); (0, 0, 1, 1)].

15. The CW-TOF camera according to claim 6 wherein the illumination zones comprise two different types of illumination zones, Z1 and Z2.

16. The CW-TOF camera according to claim 15 wherein a number of perturbation phase shifts during an exposure period is equal to two and the sequence of perturbation phase shifts is (0°, 180°).

17. The CW-TOF camera according to claim 16 wherein the synchronized sequences of perturbation phase shifts and optical pattern modifiers for the illumination zones during an exposure period are respectively [Z1: (0°, 180°); (1,0.5−E)] and [Z2: (0°, 180°); (0, 0.5+E)], where E<0.5.

18. The CW-TOF camera according to claim 16 wherein the synchronized sequences of perturbation phase shifts and optical pattern modifiers for the illumination zones during an exposure period are respectively
[Z1: (0°,180°); (1+k cos(0°+ξ), (1+k cos(180°+ξ)], and
[Z2: (0°,180°); (1+k cos(180°+ξ), (1+k cos(0°+ξ)].

19. The CW-TOF camera according to claim 15 wherein the number N of perturbation phase shifts is greater than two and the sequences of perturbation phase shifts and optical pattern modifiers for the illumination zones during an exposure period are respectively,
[Z1: $(\lambda_1, \lambda_2, \ldots \lambda_N)$; $(1+\cos \lambda_1, 1+\cos \lambda_2, \ldots, 1+\cos \lambda_N)$] and
[Z2: $(\lambda_1, \lambda_2, \ldots \lambda_N)$; $(1-\cos \lambda_1, 1-\cos \lambda_2, \ldots, 1-\cos \lambda_N)$].

20. The CW-TOF camera according to claim 1 wherein the different types of illumination zones are continuous illumination zones for which illumination of features in the scene are continuous functions of locations of the zones.

21. The CW-TOF camera according to claim 20 wherein the number N of perturbation phase shifts is greater than two and the illumination zones are defined by a phase $\xi_L$ that is a continuous function of location in the scene and a sequence of perturbation phase shifts and optical pattern modifiers during an exposure period for an illumination zone having phase $\xi_L$, is one of the following:
[$(\lambda_1, \lambda_2, \ldots \lambda_N)$); (1+k cos$(\lambda_1+\xi_L)$, (1+k cos$(\lambda_2+\xi_L)$, ..., (1+k cos$(\lambda_N+\xi_L)$)], or
[$(\lambda_1, \lambda_2, \ldots \lambda_N)$ (1+cos $\lambda_1$ cos $\xi_L$), (1+cos $\lambda_2$ cos $\xi_L$), ..., (1+cos $\lambda_N$ cos $\xi_L$)].

* * * * *